Feb. 20, 1934.  W. H. RADFORD  1,947,796
GENERATOR MOUNTING
Filed Aug. 26, 1929    2 Sheets-Sheet 1

INVENTOR.
William H. Radford
BY
White, Prost, Flehr & Lothrop
ATTORNEYS.

Feb. 20, 1934.    W. H. RADFORD    1,947,796
GENERATOR MOUNTING
Filed Aug. 26, 1929    2 Sheets-Sheet 2

INVENTOR.
William H. Radford
BY
White, Prost, Fleck & Lothrop
ATTORNEYS.

Patented Feb. 20, 1934

1,947,796

UNITED STATES PATENT OFFICE 1,947,796

GENERATOR MOUNTING

William H. Radford, San Leandro, Calif., assignor to Caterpillar Tractor Co., San Leandro, Calif., a corporation of California Application August 26, 1929. Serial No. 388,328

16 Claims. (Cl. 64—89)

My invention relates to the positioning of an auxiliary unit such as a generator or magneto upon a source of motive power as an automotive engine.

It is an object of my invention to provide a simple and rugged means for positioning an auxiliary unit upon an engine in such a manner that the driving of the unit is accomplished in a most desirable manner.

Another object of my invention is to provide a mounting for use with such a unit as a generator, the unit being readily removable from the mounting.

A further object of my invention is to provide a mounting for a unit which is readily adapted to receive various of the usual units.

The invention possesses other advantageous features, some of which with the foregoing will be set forth at length in the following description where I shall outline in full that form of the mounting of my invention, which I have selected for illustration in the drawings accompanying and forming part of the present specification. In said drawings I have shown one form of mounting embodying my invention, but it is to be understood that I do not limit myself to such form since the invention, as set forth in the claims, may be embodied in a plurality of forms.

In the drawings, to which I have made reference, Fig. 1 is a front elevation of an automotive engine with a portion thereof cut away to show the preferred form of mounting of my invention.

Figure 1:
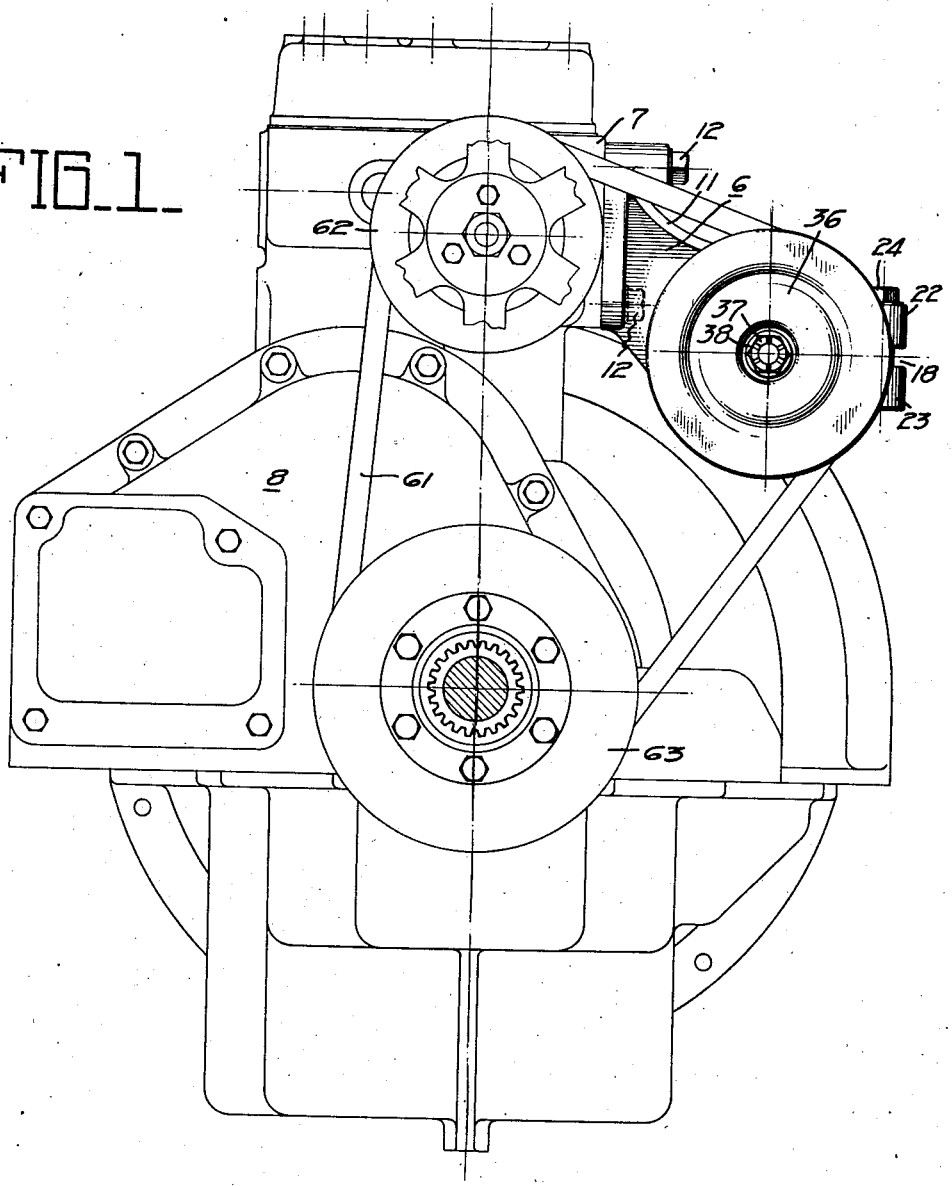

My invention may be briefly characterized as comprising the provision of a mounting adapted to receive various of the standard units available, the mounting being further adapted to permit of the unit being instantly inserted or removed.

In automotive devices such as tractors it is frequently desired to provide such auxiliary units as generators for the purpose of furnishing additional electrical power. To enable this attachment to be made in a facile and yet in a secure manner I preferably provide the generator mounting indicated generally 6 which is adapted to be secured upon a suitable pad 7 formed upon the engine 8. The mounting is conveniently formed of a bracket 11 which is secured to the engine by suitable studs 12.

In accordance with my invention I provide the bracket 11 with the usually arcuately shaped extending portions 16 and 17 providing a casing for unit 15. These portions are so related that their inner peripheries substantially define the contour of the unit 15 intended to be secured. Thus, in the drawings, I have shown them practically circular since the generator unit with which I have usually employed them is cylindrical in outline.

Figure 2:
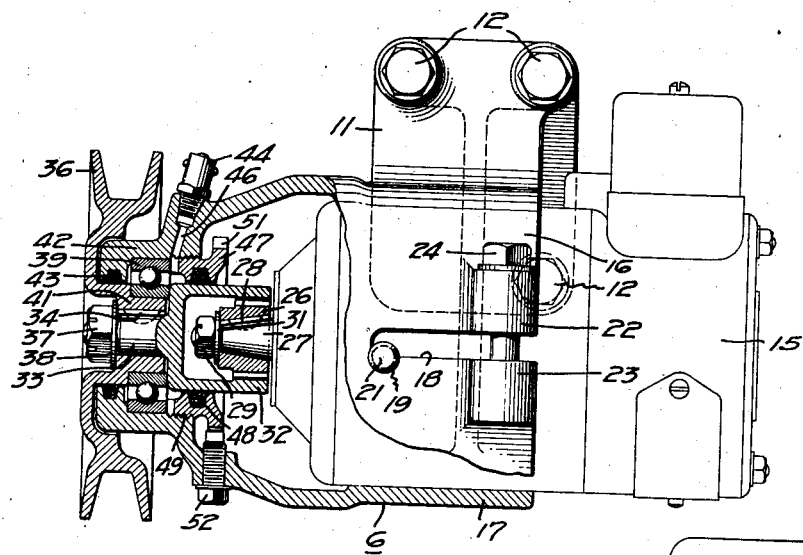
Fig. 2 is a plan view partly in cross section of a form of mounting employed, a unit being shown positioned in the mounting.
Figure 3:
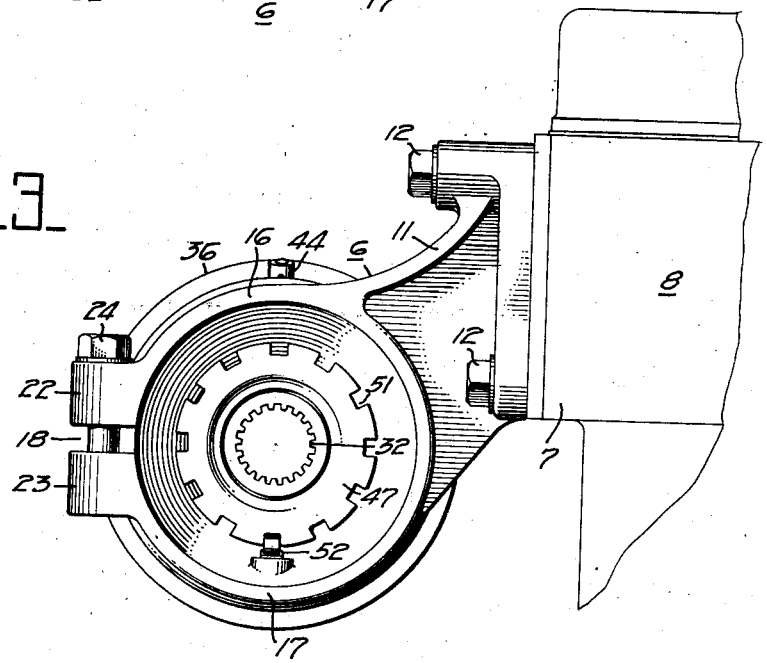
Fig. 3 is an end elevation of the mounting shown in Fig. 2 with the unit removed.

To ensure that the unit 15 is positioned correctly in the mounting I preferably provide the portions 16 and 17 so that a slot 18 is formed longitudinally of the mounting as is shown in Fig. 2. This slot is preferably provided with a cylindrical depression 19 in the direction of rotation of the rotatable element in the unit 15, in this instance the armature of the generator, so that rotation of the unit tends to keep projection 21 engaged with depression 19. The generator unit is conveniently provided with a projection 21 which is adapted to form a bayonet connection with the slot 18 and the cylindrical depression 19. It is to be noted that the unit upon being inserted into the space confined by the bracket extensions 16 and 17 is directed into a predetermined position by virtue of this connection. Furthermore, the unit is locked in position with respect to the mounting in such a manner that it is not readily displaced longitudinally therefrom.

To ensure that the unit is retained in position I provide ears 22 and 23 upon the bracket extensions 16 and 17 respectively. The ear 22 is preferably adapted to pass a stud bolt 24 while the ear 23 is usually threaded to receive the stud. By screwing the stud down into the ear 23 the bracket extensions are drawn together and the unit confined by them is drawn into a relatively severe frictional engagement while edges of slot 18 are drawn together and slot 18 is made smaller so projection 21 cannot be withdrawn.

To facilitate the driving of the generator I prefer that a gear 26 be attached to driving shaft 27 of the generator. This is conveniently accomplished through the use of a key 28 extending into a suitable key way. The gear when keyed to the shaft is conveniently retained in place by a lock nut 29 and lock washer 31. To drive the gear 26 I usually provide an internal gear 32 which is secured by an extension 33 and a key 34 to a suitable driving connection as the pulley 36. The internal gear is further retained to the pulley by lock nut 37 and lock washer 38. The pulley and internal gear are conveniently mounted for rotation by means of the roller or ball bearing 39 which is usually secured in housing extension 42 of the bracket and surrounds and engages an extending portion 41 of the pulley to provide for its rotation.

To provide for the lubrication of the bearing 39 I preferably position a washer 43 of a suitable material as felt in the housing 42 to engage the extension of the pulley. A grease gun fitting 44 of known type is conveniently placed on the housing in communication with the passageway 46 and the roller bearing 39. To seal the inner end of the housing I preferably provide a usually serrated bushing 47. This bushing is conveniently fitted with another washer 48 adapted to abut against the internal gear to retain the lubricant in contact with the roller bearing.

To ensure that the bushing is readily positioned with respect to the housing I preferably form threads 49 in such a manner that the bushing is readily screwed into the housing. To secure it in place against rotational movement occasioned by tight frictional engagement of the washer with the internal gear I preferably form it with the previously mentioned serrations 51. A stud 52 preferably extends through the housing and is adapted to engage the desired serration when the position of the bushing has been determined.

The generator is conveniently mounted as an auxiliary unit upon an automotive engine as is shown in Fig. 1 by the use of the mounting of my invention. Upon positioning the unit in place its driving is expediently accomplished from an available power source on the engine. Thus in the form shown in Fig. 1 a belt 61 is readily passed from the pulley 36 about a fan pulley 62 and a drive shaft pulley 63 so that upon operation of the engine the unit is driven in accordance with the speed of the engine. It is of course expedient that the size of the pulley 36 be adapted to supply the correct power and speed to the unit in accordance with the speed of the other pulleys.

I prefer that a belt be utilized for the driving of the unit inasmuch as when the engine is suddenly killed, the inertia present in the revolving parts of the generator acts only to cause the belt to slip. When direct mechanical drives are provided between the generator and the engine, difficulties are encountered when the engine is killed and the inertia of the generator armature is thrown on the pins, gears, etc., which are depended on to transmit the power.

Further, by providing the mounting of my invention, the unit is positioned on an engine in a simple manner, is readily accessible, and is formed in such a manner that the driving of the unit is accomplished without the unit being directly subjected to the pulling stress of the belt. This is particularly advantageous in that the bearings of the unit are not subjected to as severe stresses and consequently give longer and more satisfactory service.

I claim:

1. A motor, an auxiliary unit having a pinion, a rotatable member driven by said motor, an internal gear secured thereto, a bearing for said member, and a casing attachable to said motor to support and to enclose said bearing, said internal gear and said pinion.

2. A motor, a casing thereon having a cylindrical portion, a coupling journalled on a wall of said casing, adapted to be driven from said motor and having a cylindrical portion, an auxiliary unit having a cylindrical body portion to fit said casing cylindrical portion and a substantially cylindrical coupling to fit said cylindrical portion of said driven coupling.

3. A motor, a casing thereon having a cylindrical portion, a coupling mounted in said casing, adapted to be driven from said motor and having a cylindrical portion, an auxiliary unit having a cylindrical body portion to fit said casing cylindrical portion and a substantially cylindrical coupling to fit said cylindrical portion of said driven coupling, and means in said casing and on said motor to restrain relative displacement of the parts to actual displacement in a direction parallel to the axes of said cylindrical portions.

4. A motor, a casing thereon having a cylindrical portion, a coupling mounted in said casing, adapted to be driven from said motor and having a cylindrical portion, an auxiliary unit having a cylindrical body portion to fit said casing cylindrical portion and a substantially cylindrical coupling to fit said cylindrical portion of said driven coupling, and means in said casing and on said motor to restrain relative displacement of the parts to actual displacement in a direction parallel to the axes of said cylindrical portions, except when said couplings are in operative position, and to lock said cooperating cylindrical parts in said operative position.

5. A motor, a casing thereon having a cylindrical portion, a coupling mounted in said casing, adapted to be driven from said motor and having a cylindrical portion, an auxiliary unit having a cylindrical body portion to fit said casing cylindrical portion and a substantially cylindrical coupling to fit said cylindrical portion of said driven coupling, and means in said casing and on said motor to restrain relative displacement of the parts to actual displacement in a direction parallel to the axes of said cylindrical portions, except when said couplings are in operative position, and lock said cooperating cylindrical parts in said operative position, and to clamp said unit in said casing.

6. A motor, a casing adapted to be secured to said motor, a shaft in said casing having an end extending from said casing, a bearing for said shaft sealed in said casing, an auxiliary unit adapted to be slid into said casing, and means to secure said unit in said casing to seal said casing.

7. A motor, an auxiliary split cylindrical casing adapted to be secured to said motor, a shaft in said casing having an end extending from said casing, an auxiliary cylindrical unit adapted to be slid into said casing, means to connect said unit to the other end of said shaft, and means to secure said unit in said casing including a bayonet connection between said unit and said casing, and means to draw said split casing together to secure said unit.

8. A casing having a slot extending inwardly from an edge of said casing, a unit adapted to be inserted in said casing, said unit including a projecting member adapted to engage said slot, and means to draw opposite edges of said slot together.

9. A casing having a bayonet slot extending inwardly from an edge of said casing, a unit adapted to be inserted in said casing including a projecting member adapted to engage said slot to provide a bayonet connection with said slot, and means to draw opposite edges of said slot together to prevent withdrawal of said unit.

10. In combination, a tubular bracket casing, a rotatable member, means for journaling and sealing said member in one end of the casing with the member projecting into the casing, a unit adapted to be inserted through an opposite end of the casing and having a rotatable member adapted to be connected with said first-mentioned member, and a bayonet connection between the unit and the casing for latching the unit in a predetermined fixed position so that proper connection of the rotatable members is maintained.

11. In combination, a tubular bracket casing, a rotatable member, means for journaling and sealing said member in one end of the casing with the member projecting into the casing, a unit adapted to be inserted through an opposite end of the casing and having a rotatable member adapted to be connected with said first-mentioned member, a bayonet connection between the unit and the casing for latching the unit in a predetermined fixed position so that proper connection of the rotatable members is maintained, said bayonet connection including a slot extending from said opposite end of the casing, and means for drawing together opposite edges of said slot to clamp the unit in the casing and to seal said opposite end of the casing.

12. In combination, a bracket having a bayonet slot, a rotatable member, a device supported by said bracket and having a rotatable member for connection with said first-mentioned member, the slot having a portion extending in the direction of rotation of the rotatable members, and a pin on said device in engagement with said slot portion to latch said device to said bracket and to prevent rotation of said device by said members.

13. In combination, a bracket casing, a rotatable member projecting through one end of the casing, a unit mounted in an opposite end of said casing and having a rotatable member for connection with said first-mentioned rotatable member, means including a bayonet slot in the wall of the casing and a pin on said unit for latching and positioning the unit in the casing, the slot having a portion extending in the direction of rotation of said rotatable members in which portion the pin is adapted to finally engage, and means for drawing together opposite edges of said slot to clamp the unit in said casing.

14. In combination, a bracket, a rotatable member, a unit mounted on said bracket and having a rotatable member for connection with said first-mentioned rotatable member, means including a slot in the bracket extending from an edge thereof and a pin on said unit for positioning the unit on the bracket, and means for clamping the unit on the bracket.

15. In combination, a rotatable member, a device having a rotatable member for telescopic connection with said first-mentioned member by means of an internal gear on one of said members and an external gear on the other of said members, a bracket for supporting the device, and a bayonet connection between the bracket and the device for latching and positioning the device on the bracket, whereby proper connection of said gears is maintained.

16. A motor, a rotatable member driven therefrom, an auxiliary unit having a rotatable member adapted for connection with said first-mentioned rotatable member, a tubular bracket casing into which the first-mentioned member projects at one end, means for sealing said end of the casing, said unit being adapted to be inserted through the opposite end of the casing, a bayonet connection between the unit and the casing for latching and positioning the unit in the casing, said bayonet connection including a slot extending from said opposite end of the casing, and means for drawing together opposite edges of the slot to clamp the unit in the casing.

WILLIAM H. RADFORD.